US007096422B2

(12) United States Patent
Rothschiller et al.

(10) Patent No.: US 7,096,422 B2
(45) Date of Patent: Aug. 22, 2006

(54) MARKUP LANGUAGE VISUAL MAPPING

(75) Inventors: Chad Rothschiller, Edmonds, WA (US); Robert Collie, Kirkland, WA (US); Joseph Chirilov, Kirkland, WA (US); Kelly J. Lynch, Redmond, WA (US); Ramakrishnan Natarajan, Redmond, WA (US); Juha Niemisto, Mercer Island, WA (US); Jianlan Song, Sammamish, WA (US); James Rivera, Bellevue, WA (US); Parul Dalia, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 455 days.

(21) Appl. No.: 10/377,256

(22) Filed: Feb. 28, 2003

(65) Prior Publication Data
US 2004/0172616 A1 Sep. 2, 2004

(51) Int. Cl.
G06F 15/00 (2006.01)
(52) U.S. Cl. ..................... 715/513; 715/503
(58) Field of Classification Search .............. 715/513, 715/503
See application file for complete search history.

(56) References Cited

U.S. PATENT DOCUMENTS

| | | | | |
|---|---|---|---|---|
| 6,631,497 | B1 * | 10/2003 | Jamshidi et al. | 715/514 |
| 7,017,112 | B1 * | 3/2006 | Collie et al. | 715/513 |
| 2003/0046317 | A1 * | 3/2003 | Cseri et al. | 707/513 |
| 2003/0069887 | A1 * | 4/2003 | Lucovsky et al. | 707/10 |
| 2003/0101190 | A1 * | 5/2003 | Horvitz et al. | 707/100 |
| 2003/0131073 | A1 * | 7/2003 | Lucovsky et al. | 709/219 |
| 2003/0163585 | A1 * | 8/2003 | Elderon et al. | 709/246 |
| 2004/0181748 | A1 * | 9/2004 | Jamshidi et al. | 715/503 |

OTHER PUBLICATIONS

Integrated Development Environment, XML SPY User and Reference Manual Version 4.4, 1998-2001, ALTOVA, pp. 1-565.*
Amer-Yahia, Sihem and Divesh Srivastava, "A Mapping Schema and Interface for XML Stores", Nov. 8, 2002, WIDM'02.*

(Continued)

Primary Examiner—Doug Hutton
Assistant Examiner—R. Singh
(74) Attorney, Agent, or Firm—Merchant & Gould P.C.

(57) ABSTRACT

Methods and systems are provided for mapping markup language data and schema, such as eXtensible Markup Language (XML) data and XML schema, to selected fields (cells, columns, rows) of a spreadsheet application document. An XML schema file is associated with a spreadsheet application document by providing a mechanism of adding the schema definitions to the spreadsheet application document. Furthermore, XML schema constructs such as elements, attributes, and simple content are associated to regions in the spreadsheet application document by providing a tree view structure of a generalized instance of a given XML schema file. A user may drag and drop markup language nodes representing elements, attributes and simple data content, from the tree view structure of the generalized instance of the XML schema file onto a spreadsheet worksheet grid. Once a cell, column or row in worksheet grid accepts the dropped element or attribute, an association is made between the target location in the worksheet grid, and the definition, data type and rules associated with the dropped element or attribute by setting an XML path language (XPATH) marker to point the target location back to the selected element or attribute in the XML schema file. Having all or partially all desired markup language elements or attributes associated with desired target locations in the spreadsheet grid, a general mapping of marked-up locations in the spreadsheet grid and their associated elements and/or attributes in an associated XML schema file is created.

53 Claims, 8 Drawing Sheets

OTHER PUBLICATIONS

Cantor, Abigail, "XML-The lingua Franca of the Information Age".*

Klarlund, Nils, Anders Moller, and Michael Schwartzbach, "DSD: A schema Language for XML", FMSP '00, 2000.*

Leif, Robert, SIGAda 2001 Workshop, "Creating a Symbiotic Relationship between XML and Ada", Sep. 2002, Ada Letters, vol. XXII, No. 3.*

PC Today Cover Stories, Dec. 2004, vol. 2, Issue 12, "Work with XML,XML and Microsoft Office 2003".*

Mehta, Mitul, "Excel 2003", http://www.zdnetindia.com/reviews/software/applications/stories/84846.html.*

XMLSpy User and Reference Manual Version 4.3, Altova, 1998-2001.*

* cited by examiner

Fig. 3

MARKUP LANGUAGE VISUAL MAPPING

FIELD OF THE INVENTION

This invention relates to methods and systems for mapping markup language elements to a document. More particular, the present invention relates to mapping eXtensible Markup Language (XML) elements from an XML schema file to a spreadsheet document to which the schema file is associated.

BACKGROUND OF THE INVENTION

Computer software applications allow users to create a variety of documents for use in work, education and leisure. For example, a spreadsheet application allows users to store, manipulate, print and display a variety of alphanumeric data. A word processing application allows users to create letters, articles, books, memoranda, and the like. Such applications have a number of well-known strengths, including rich editing, formatting and calculation.

To keep up with demands for more advanced functionality for such computer software applications, software developers have begun to use structured data formats, including markup languages, such as eXtensible Markup Language (XML), to allow users to annotate a software application document to give the document a useful structure apart from the normal functionality of the software application responsible for creating the document or apart from the visible formatting associated with the document. For example, the user may wish to create using her spreadsheet application a template document for preparation of a purchase order to be used in her company's sales department. By applying structure to the document, purchasers or other institutions or persons receiving the document make use of the structure by processing the document to utilize data defined by the document structure.

Some software applications, such as word processing applications, allow users to annotate a document with XML elements so that the user may define certain data types and data definitions for data inserted into the document. A resume document, for example, may include an "experience" section in which the user will include present and past work experience. Using XML, the user may desire to markup the "experience" section of the document to define that certain allowable information in a prescribed order and in a prescribed number may be included in the experience section of the document. For example, the user may wish to markup the experience section of the document to allow four present or past experience items.

Unfortunately, prior art spreadsheet applications allow very limited use of XML data. Bulk XML data may be imported where the user points to an XML file and the spreadsheet application imports that file into the spreadsheet grid. But, the user gets no control over how the data is laid out or which data is imported because all of the data is imported. Under prior spreadsheet applications, manual coding of XML data to a spreadsheet application may be required in which a programmer writes their own custom code for handling import and/or export of XML data. This code may be in the form of an XSLT transformation file, or it may be a more traditional programming language like VBA or C++. Such custom programming is time consuming, expensive and is difficult to apply generally to spreadsheet application documents.

Prior spreadsheet applications do not establish a relationship between the XML data and the spreadsheet grid. A relationship between the XML data and the grid allows the user to have a custom view of the XML data. For example, if a user only wants elements <a>, <b>, and <e> to show up in the grid, and to skip elements <c> and <d>, that preference needs to be stored somewhere. Furthermore, if the user wants element <b> to be displayed first and show up in column A, followed by elements <a> and <e> in columns B and C, that preference needs to be stored as well. If the user wants the data to begin appearing in row 6 rather than at the top of the grid sheet, that preference will need to be stored as well. Because prior spreadsheet applications allow no custom control over how the data is imported and displayed, there is nothing for the spreadsheet application to remember about the data. Accordingly, no relationship, between the spreadsheet and the XML data is established.

It is with respect to these and other considerations that the present invention has been made.

SUMMARY OF THE INVENTION

Embodiments of the present invention provide methods and systems for applying XML data to a spreadsheet application document. Embodiments further provide for establishing a relationship between the XML data and a spreadsheet application grid to which it is applied so that imported XML data is positioned in the proper location in the grid, and so upon export of XML data from a spreadsheet application grid, the correct data in the grid is used to generate the correct and resulting XML data for export.

Generally described, methods and systems of the present invention enable XML schema files to be associated with a spreadsheet application document by providing a tree view structure of a generalized instance of a given XML schema file. A user may drag and drop markup language elements, simple content and attributes from the tree view structure of the generalized instance of the XML schema file onto a spreadsheet worksheet grid by selecting nodes of the tree view structure representing the elements, simple content, and attributes. Once a cell, column (range of vertical cells) or row (range of horizontal cells) in worksheet grid accepts the dropped element or attribute, an association is made between the target location in the worksheet grid, and the definition, data type and rules associated with the dropped element or attribute by setting an XML path language (XPATH) marker to point the target location back to the selected element or attribute in the XML schema file. Once all desired markup language elements or attributes are associated with desired target locations in the spreadsheet grid, a general mapping of marked-up locations in the spreadsheet grid and their associated elements and/or attributes in an associated XML schema file is created.

More particularly described, a method for mapping eXtensible Markup Language (XML) data to a spreadsheet application document is provided. An XML schema file is associated with a spreadsheet application document defining permissible data definitions for the document. An instance structure associated with the XML schema file is built having XML nodes representing all available elements and attributes defined by the associated schema file and simple data content that may be applied to the document and representing a relationship of the available elements and attributes to one another as defined by the associated schema file. A tree view of the instance structure is displayed for providing a visual representation of the instance structure of the associated XML schema file whereby the tree view contains hierarchically-structured nodes visually representing XML nodes (elements and attributes) defined by the associated schema file that may be validly applied to the document according to the associated schema file. An element or attribute selected from the tree view is applied to a target location in the document by a user operation such as drag & dropping the nodes from the tree view onto the workbook grid. An XPATH pointer is written to the target location for pointing the target location to the selected element or attribute in the associated schema file via the instance structure. A mapping is created between the document and the associated schema file including building a collection of XPATH pointers associated with all selected elements or attributes that are applied to the document for pointing target 'mapped' spreadsheet grid range locations to corresponding nodes in the associated schema file for defining each element and attribute applied to the document. A visual indication is provided in the tree view of any elements or attributes that have been applied to the document. A visual indication is provided in the target location that a selected element or attribute has been applied to the target location.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

BRIEF DESCRIPTION OF THE DRAWINGS

FIG. 3 illustrates a computer screen display showing data not structured in accordance with an embodiment of the present invention.

DETAILED DESCRIPTION OF THE PREFERRED EMBODIMENT

The following description of the embodiments of the present invention is made with reference to the above-described drawings wherein like numerals refer to the like parts or components throughout the several figures. The present invention is directed to methods and systems for mapping markup language elements or attributes to a spreadsheet application grid.

Figure 1:
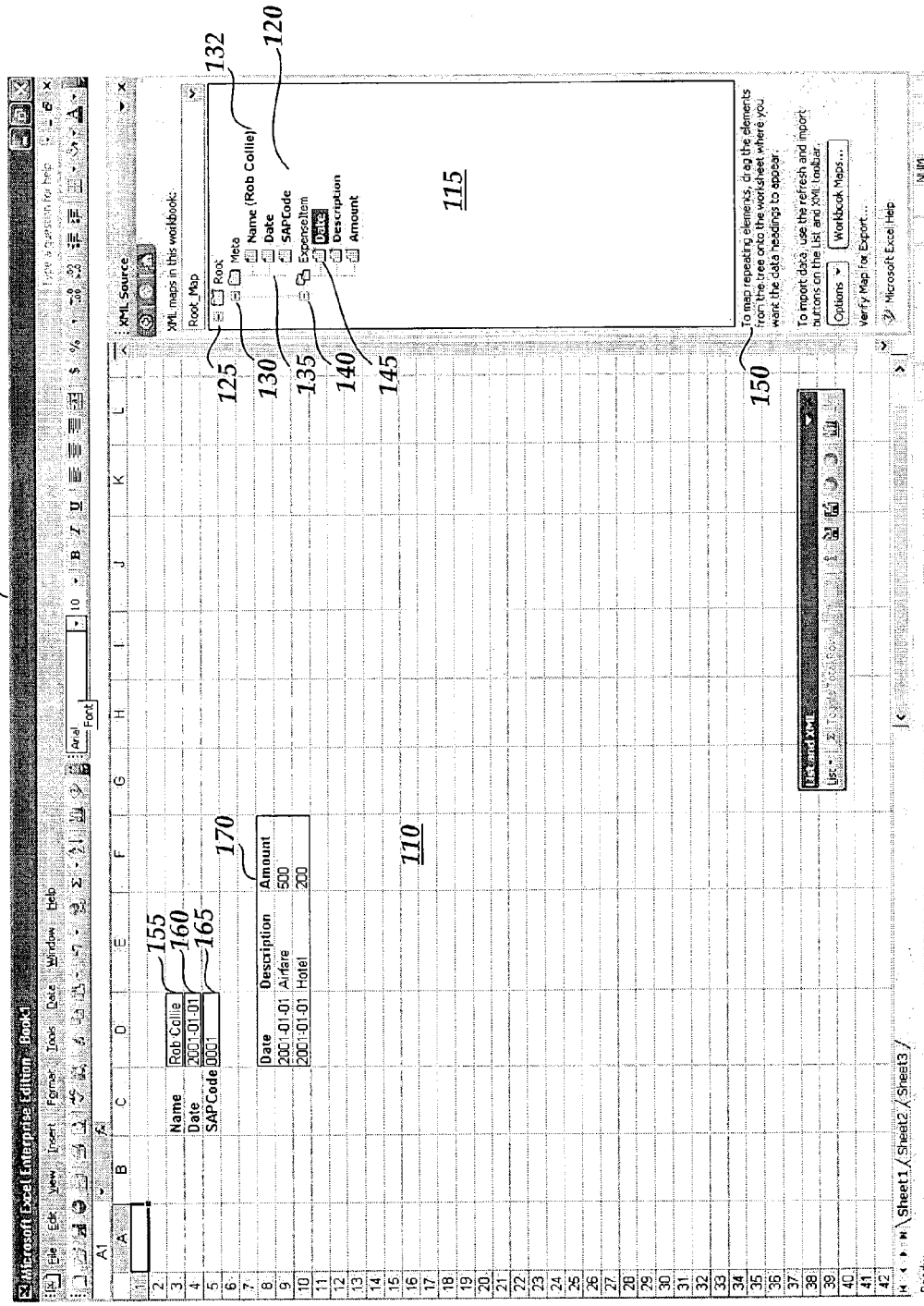
FIG. 1 illustrates a computer screen display of a typical spreadsheet application worksheet and associated tree view pane showing a generalized iinstance of an XML schema file associated with the spreadsheet application document.

Referring now to FIG. 1, a typical spreadsheet application screen display 100 is illustrated. A suitable spreadsheet application for presentation of the screen display 100 in accordance with an embodiment of the present invention is Excel® manufactured by Microsoft Corporation in Redmond, Wash. According to the exemplary screen display 100 illustrated in FIG. 1, a spreadsheet application workspace grid (hereafter "grid") 110 is illustrated for entering, manipulating, and calculating data including text and numeric data. On the right hand side of the screen display 100, a tree view structure 120 of a generalized instance of an eXtensible Markup Language (XML) schema file is presented in a task pane 115. The tree view structure 120 includes nodes representing XML elements, attributes and simple data content. The tree view structure 120 includes a root element 125, child elements 130 and 140 and a plurality of child elements 135 and 145 under the elements 130 and 140, respectively. As will be described in detail below, the tree view structure 120 illustrated in FIG. 1 represents a generalized instance of an XML schema file associated with the spreadsheet application document illustrated in the spreadsheet grid 110.

Referring to the grid 110, cells 155, 160, and 165 illustrate single non-repeating elements dragged to the grid 110 from the tree view structure 120. The column list 170 illustrates repeating elements, <date>, <description> and <amount> dragged from the tree view structure 120 to the grid 110. As illustrated in FIG. 1, data associated with those elements is also illustrated. A help text 150 is illustrated for providing helpful information for how to map repeating or non-repeating elements from the tree view structure 120 to the grid 110. As described below, dragging a given element or attribute from the tree view structure 120 to the grid 110 allows the user to annotate a target location in the grid 110 with markup language structure associated with the dragged and dropped element or attribute. For example, referring to FIG. 1, the <date> element 135 is dragged from the tree view structure 120 to a target location D4 in the spreadsheet grid 110. Data associated with that target location, for example "2001-01-01" as illustrated in FIG. 1, is shown in the target spreadsheet cell D4 after the user performs and Import or Refresh operation to import that data to the grid. Initially, after each drag and drop, only empty cells are populated with XML data. User data such as the date, shown above, is imported. However, if the target range already contains user data, such as the date, that data is kept and becomes associated with the XML data applied to the target range. Accordingly, a previously prepared spreadsheet document containing user data may be annotated with XML data.

When a selected element or attribute is dragged from the tree view structure 120 and is dropped onto a target location in the spreadsheet grid 110, an XPATH maker is written to the target location to point the target location back to the markup language schema file element or attribute to which the target location is now associated. The mapping of the markup language elements or attributes to target locations in the spreadsheet grid, as described above, is advantageous because a subsequent user may utilize data in the spreadsheet application grid according to the data definitions of the associated markup language schema file. For example, a subsequent user of the XML data file created by the spreadsheet grid 110 may utilize that data file in accordance with the associated markup language schema file. For example, if the consumer wishes to extract the "date" from the spreadsheet grid 110, the consuming application may make use of the mapping between the <date> element of the XML schema file to the grid location D4 to readily locate data associated with the "date" for extracting that data or otherwise utilizing that data. If the data contained in the grid 110 is consumed, by a word processing application, for example, even if functionality associated with the spreadsheet application may not be used by the consuming word processing application, data from the spreadsheet grid 110 may be utilized by the word processing application in accordance with the associated markup language schema file defining the data associated with the spreadsheet application document.

Advantageously, the tree view structure 120 presents a visual representation of an associated schema file in the tree view pane 115 and allows a user to interactively drag and drop elements or attributes of the XML schema file to the spreadsheet grid and immediately see the result of associating the markup language elements or attributes with a target location in the spreadsheet grid. Creating the mapping between the selected schema file and the spreadsheet grid thus creates a mapping for a whole class of data defined by the associated schema file.

Figure 2:
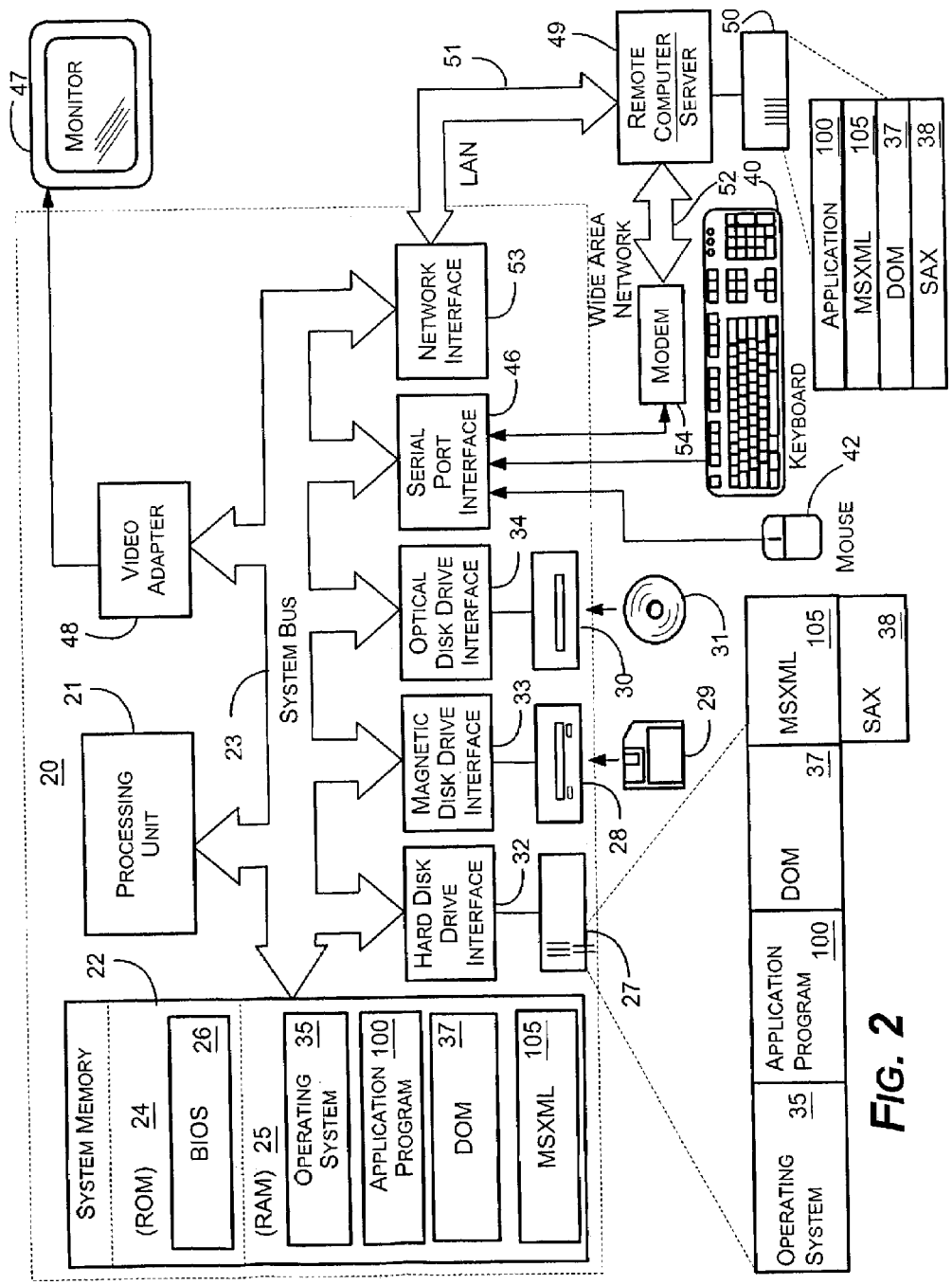
FIG. 2 is a block diagram of a computer and associated peripheral and networked devices that provide an exemplary operating environment for the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 and one or more application programs 100, such as a spreadsheet application program, a word processor program, or other type of program module. Other program modules illustrated in FIG. 2 include an XML processing module 105, a document object model (DOM) parser 37, and a simple application programming interface for XML (SAX) parser 38. According to an embodiment of the invention, the XML module 105 is used by the spreadsheet application 100 for processing data formatted according to the eXtensible Markup Language. A suitable XML processing module is MSXML manufactured and marketed by Microsoft Corporation of Redmond, Wash.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In order to provide XML data with a set of grammatical and data type rules governing the types and structure of data that may be included in a given XML data file an XML schema file is associated with the XML data for providing the rules governing each of the XML elements and tags with which the user may annotate the given XML data. For example, a "purchase order" XML data file may have an attached or associated schema such as "purchaseorder-schema.xsd" for providing the allowable set of XML elements such as a <date> element, <price> element, <quantity> element, and so on. The schema includes the rules governing the order with which those elements may be applied to the XML data and specific rules associated with individual elements applied to the XML data. For example, a schema attached or associated with the "purchase order" XML data file may prescribe that data associated with a given element, for example a <date> element, must include a day element, followed by a month element, followed by a year element. Additionally, the schema may require that a <date> element must immediately precede a <shipment destination> element, for example.

As is understood by those skilled in the art, developers of XML schemas determine the names of XML elements and the associated data types and data structures allowed for those elements. Then, all users of XML data annotated with XML structure according to a given schema may utilize the data contained within the XML structure without regard to the overall type and structure of the XML data. For example, if a "purchase order" XML data, described above, is transmitted to a purchaser of the goods, the purchaser may develop software applications for parsing the XML data to locate specific types of data within the XML data for use by the purchaser. The purchaser may, for example only wish to print serial numbers and associated prices for certain goods. Using the schema attached to the XML data, the purchaser will know that the data associated with the XML elements have been prepared according to the schema governing the XML data. Accordingly, the purchaser may develop a software application or an Extensible Stylesheet Language Transformation (XSLT) file for locating the <price> element and for extracting the data associated therewith for insertion into the purchaser's own XML data.

Following with this example, a number of different purchasers may subscribe to the same schema for dictating the rules associated with the "purchase order" XML data so that each purchaser may then receive the "purchase order" XML data from the author of the XML data and use the data contained in the purchase order according to the XML elements structuring the data. That is, a first purchaser may only be interested in the data contained within the <price> element, while a second purchaser may be interested in extracting only the data contained in a <shipment terms> element. Each purchaser may extract the data it desires without regard to other aspects or elements of the XML data by using their own software applications or XSLT transformation files for locating the desired data according to the XML structure. This is made possible by the fact that each user of the XML data follows the data type and data structure rules prescribed in the schema attached to or associated with the XML data.

As understood by those familiar with the eXtensible Markup Language, XML namespaces provide a method for qualifying elements and attribute names used in XML documents by associating those elements and attribute names with namespaces identified by uniform resources identifier (URI) references. An XML namespace is a collection of names, identified by a URI reference, which are used in XML documents as element types and attribute names. A single XML document may contain nodes that are defined for and used by multiple software modules. For example, in accordance with an embodiment of the present invention, a single XML document, such as a spreadsheet document, may contain nodes (elements, attributes and simple data content) defined and used by different software modules. For example, an XML document may have nodes defined for and used by a spreadsheet application XML processing module, or the document may contain nodes defined for and used by or associated with one or more schema files associated with the document. For example, nodes may be associated with the spreadsheet document to associate the document with a schema file associated with a purchase order, resume document, a legal document, and the like. Accordingly, an individual document, such as an exemplary spreadsheet document may have a namespace identifying the element types and attribute names associated with each of the different software modules that may consume or use data from the document.

Figure 3:
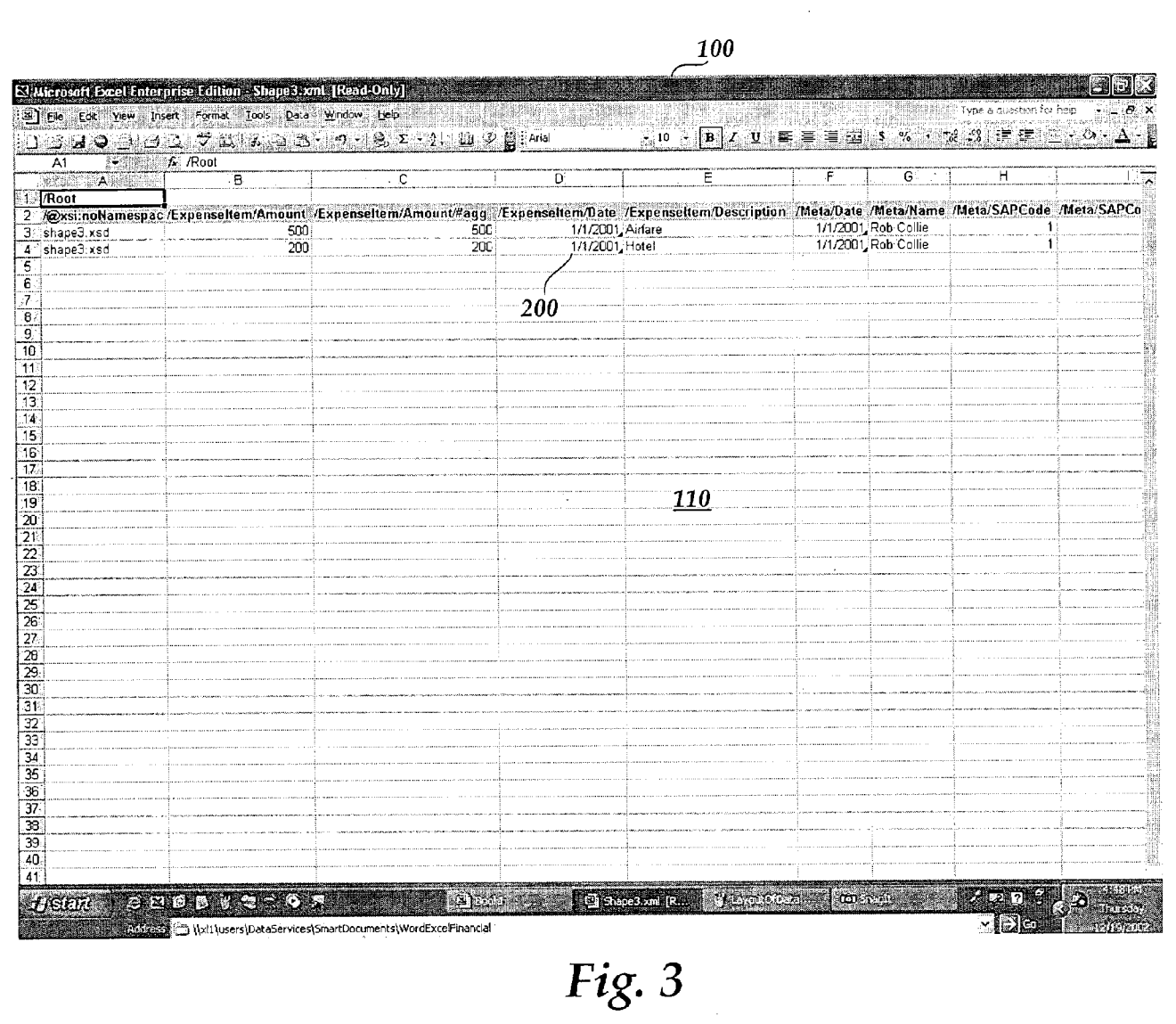

Referring back to FIG. 1, the non-repeating elements 155, 160 and 165 are shown to be applied to cells D3, D4, and D5 of the grid 110. Associated data is entered into each of those cells, as shown in FIG. 1. The repeating elements <date>, <description> and <amount> are applied at target locations D8, E8, an F8 respectively. As described in the background section above, without the functionality of the present invention, the structure associated with a markup language is lost when the associated data is imported to the spreadsheet grid 110. FIG. 3 illustrates the data of the spreadsheet grid 110, illustrated in FIG. 1, entered into the grid 110 without the benefit of the data structure applied to that data by associating the markup language schema file with the associated data.

Visual Mapping

Figure 4:
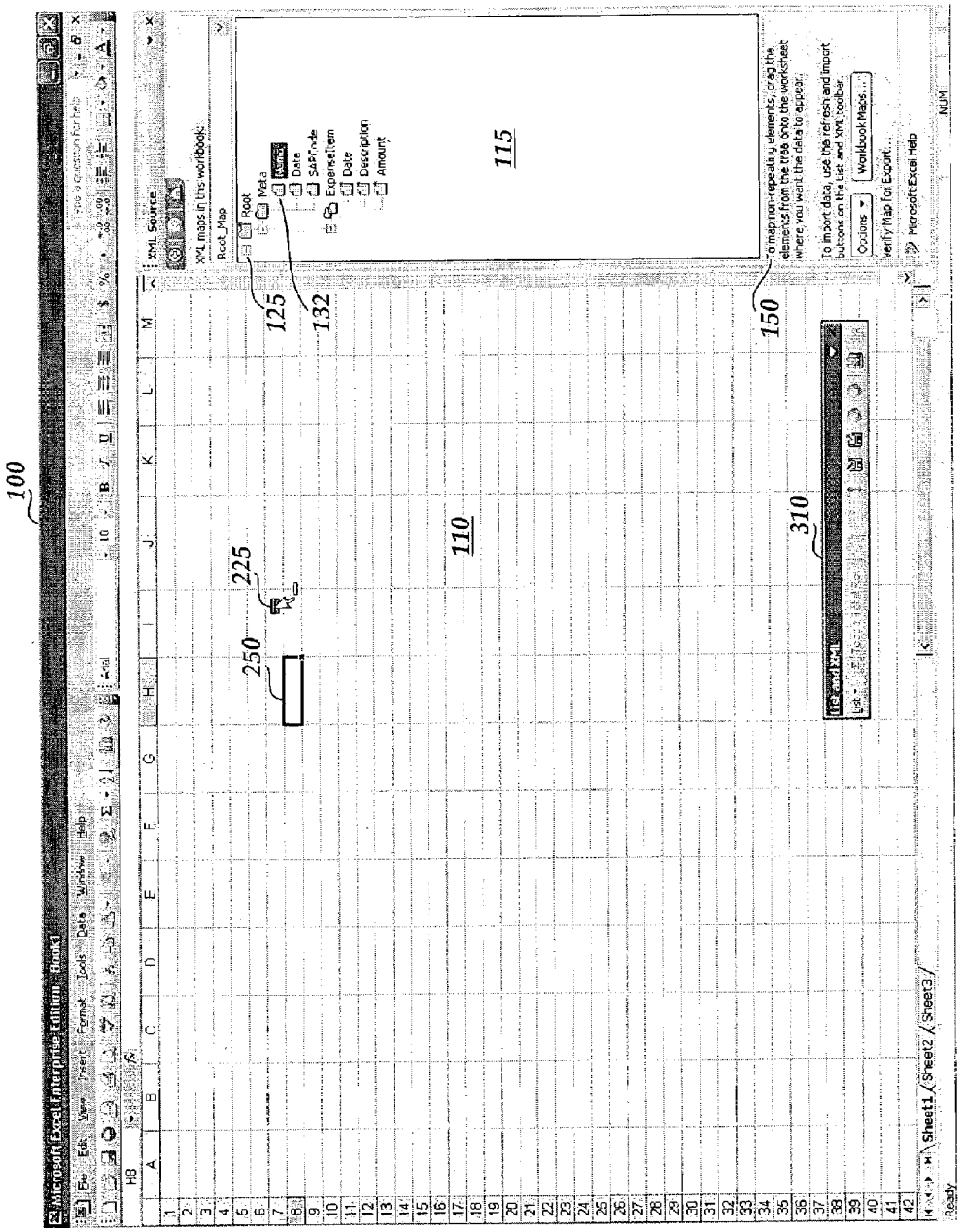
FIG. 4 illustrates a computer screen display showing the dragging and dropping of a single non-repeating XML element onto a spreadsheet workspace grid.

In accordance with embodiments of the present invention, application of markup language elements or attributes from an associated XML schema file is facilitated through a visual mapping user interface provided to the user. As shown in FIG. 4, when the user selects an element such as the <name> element 132 from the tree view structure 120 in the pane 115 for application to a cell in the grid 110, the <name> element 132 is highlighted in the tree view structure. When the user selects the element 132 from the tree view structure 120 and drags the element onto the grid 110, the user places the cursor 225 at a target location in the grid 110 such as cell H8, illustrated in FIG. 4, for placement of the annotation and structure related to the <name> element 132. If the <name> element 132 is a single non-repeating element in the tree view structure, a border 250 is drawn around the target location, for example the cell H8 of the grid 110 illustrated in FIG. 4. According to an embodiment of the present invention, the border may be colored, for example blue, to visually highlight to the user the location of the deposited markup structure.

Once the structure is dropped onto the grid 110 as described, the target cell range is now mapped to the schema file, which contains the associated markup and structure information. In order to provide additional assistance to the user, the associated element 132 in tree view structure is preferably bold faced or highlighted to indicate to the user that the element has been mapped to the grid 110. According to a preferred embodiment, if the user subsequently selects the element 132 in the tree view structure, the border 250 is shown to highlight the selected cell or range of cells. To show the user the location in the grid 110 to which that element is mapped, regardless of whether any data has been entered into that location of the grid. Likewise, if the user selects a given cell in the grid 110, any corresponding element or attribute in the tree view structure that has been mapped to that grid location is highlighted in the tree view structure to indicate to the user any element or attribute that has been mapped to the target location corresponding to the active cell range.

Figure 5:
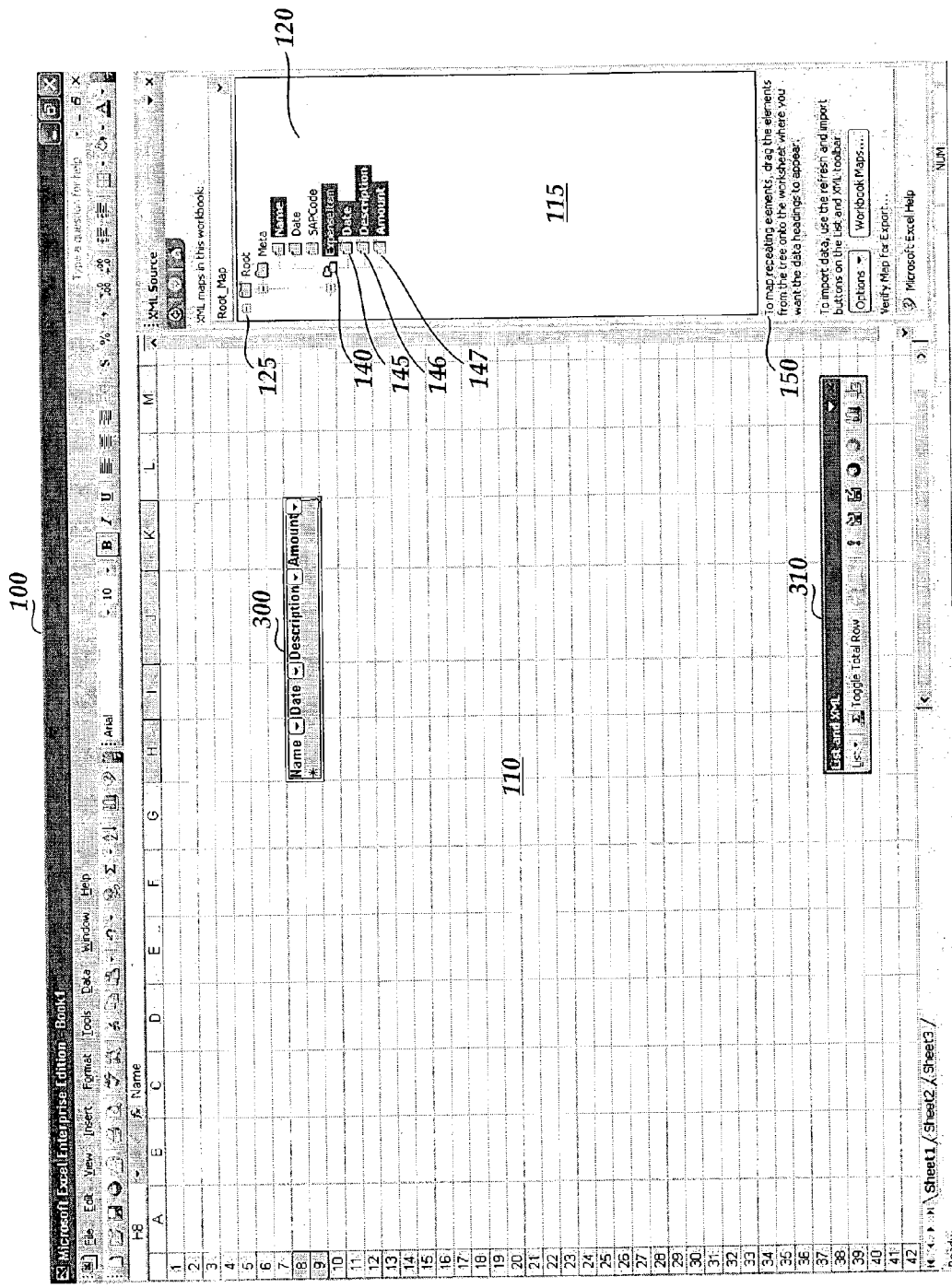
FIG. 5 illustrates a computer screen display showing the dragging and dropping of a non-repeating XML element and a plurality of repeating XML elements into a spreadsheet workspace grid.

Referring to FIG. 5, if the user selects a repeating element or attribute from the tree view structure 120 for application to the grid 110, a list object 300 with associated headings is shown to the user when the user drops the selected repeating element or attribute onto the grid 110. For example, as illustrated in FIG. 5 the <date> element 145, <description> element 146, and <amount> element 147 are repeating elements under the parent element <expense item>. According to an embodiment of the present invention, the user may create a data structure in the grid 110 to assemble data for the <date>, <description> and <amount> elements in a structured manner in the grid 110. By selecting each of the date, description and amount elements and dragging those elements to the grid 110, the list 300 is generated by creating a list object, defining both columns and rows, whose top left corner is the target cell location where the user releases the mouse (the 'drop' part of drag & drop), and whose number of list objects equal the number of nodes being dragged from the tree view, and placing the top most element (in the tree view) in the left most column of the list, followed by placement of the next element in the next column to the right in the selected list, followed by placement of the third element in the next column to the right, and so on. Subsequently, data associated with the <date>, <description>, and <amount> elements may be entered in the columns underneath the selected positions to create a structured list whereby the "date", "description", and "amount" for a first item may be placed in row 9 of grid 110, the "date", "description", and "amount" for a second item may be placed in row 10, and so on. The list object 300 becomes a structured region in the grid 110 that may be expanded down the rows of the grid 110 beneath the selected rows as data is added to the list 300 associated with the structure elements. For example, for each additional item having a date, description and amount entered into the list object 300, the structured region grows down the page of the grid 110 beneath the first selected row, for example row 8 illustrated in FIG. 5.

Advantageously, because the markup language structure of the associated schema file is now mapped to the grid 110 as selected by the user, the structure of the list whereby data associated with the "date", "description", and "amount" for a number of items will be maintained for subsequent consumption. For example, if the data entered into the grid 110 within the cell structured, as described, is exported to a different consuming application, such as a word processing application capable of processing the markup language used to annotate the grid 110, the structure applied to the grid 110 may be utilized by the subsequent consuming application. For example, a markup language-processing module of a word processing application may utilize the associated schema file to extract the data entered in the list 300 to place that data in a similar context and presentation in a word processing application document. For example, the user may wish to export to a word processing document such as a letter, the list 300 containing data associated with the "date", "description", and "amount" for a variety of purchased items.

As with the single element border 250 described in FIG. 4, the list 300 is synchronized with the tree view structure 120 in the pane 115. That is, if the user places the cursor or otherwise selects an element from the tree view structure such as the <date> element 145, a correspondingly-structured region (that region is a column of the list) in the grid 110 containing the list 300 is highlighted to the user to show the user the location of the list 300 associated with the selected element. Conversely, if the user selects a cell in the list 300 in the grid 110 where the list 300 has been structured, the corresponding elements in the tree view structure 120 are highlighted to indicate to the user the elements and/or attributes associated with the selected region in the grid 110.

The list 300 illustrated in FIG. 5 shows an additional aspect of embodiments of the present invention whereby the user has not only selected three repeating elements, namely the <date>, <description>, and <amount> elements, but the user has also selected a single non-repeating <name> element 120 as a part of the initial drag and drop of the selected elements or attributes to the grid 110. Consequently, the list 300 not only includes the repeating elements <date>, <description>, and <amount>, but the list also includes the non-repeating element <name>. According to an embodiment of the present invention, if a name, for example, John Doe, is imported in the target cell associated with the <name> element, and a plurality of data is imported for the <date>, <description>, and <amount> elements, the name data column, for example John Doe, is copied down the column underneath the "name" header, illustrated in FIG. 5 adjacent to each new row of data underneath the <date>, <description>, and <amount> elements.

If it is an undesirable result that the name data is copied down the column alongside associated data for the <date>, <description>, and <amount> elements, the user may avoid this result by first dragging and dropping the repeating elements to the grid 110 followed by a separate dragging/dropping of the non-repeating element to the grid 110. Accordingly, the <name> element will be treated as a single non-repeating element and data associated therewith will not repeat down the column underneath the target cell along with data entered or imported to the target cells for the list 300. Additionally, if a first repeating element, such as the <date> element 145 is dropped to a target location in the grid 110, such as location I8, followed by subsequent but separate drops of other associated repeating elements such as the <description> element and the <amount> element in the positions immediately adjacent to the first dropped element (for example, the <date> element), a the list 300 is still created by assuming that the user intended to create the list 300 by selecting each of the repeating elements separately as opposed to selecting, dragging, and dropping the three elements simultaneously. Alternatively, each dropped node may be treated as a separate list object.

Referring still to FIGS. 4 and 5, help text 150 may be provided to the user to provide the user helpful information on dragging and dropping elements from the tree view structure 120 to the grid 110. For example the Help text 150 illustrated in FIG. 4 provides information on dragging and dropping a non-repeating element to the grid 110, and the help text 150 illustrated in FIG. 5 provides helpful information on dragging repeating elements to the grid 110. Also illustrated in FIGS. 4 and 5 is a tool bar 310 where a variety of tools for providing additional functionality to the structured target location may be provided to the user. For example, the user may be allowed to toggle the total row, copy data from a target location, import data to a target location, print data from a target location, etc.

Figure 6:
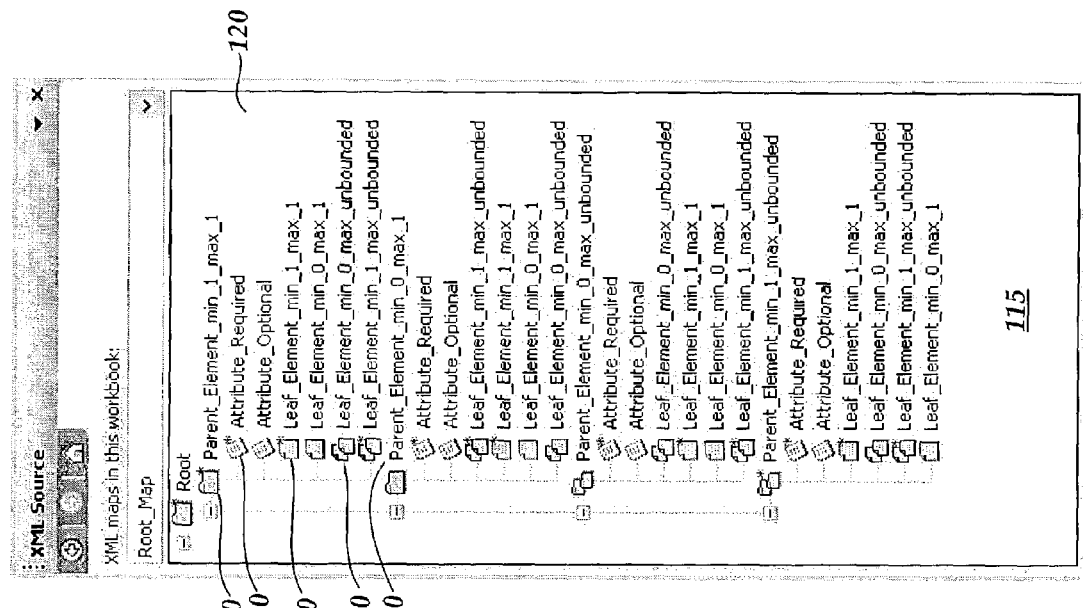
FIG. 6 illustrates a computer screen display of a tree view of a generalized instance of an XML schema file in a tree view pane and showing a plurality of icons for distinguishing different properties of XML element and/or attributes.

FIG. 6 illustrates a computer screen display of a tree view of a generalized instance of an XML schema file in a tree view pane and showing a plurality of icons for distinguishing different properties of element and/or attributes as defined in the schema. As shown in FIG. 6, a variety of icons are utilized in a tree view structure 120 for providing helpful information about the markup language elements or attributes shown in the tree view structure 120. For example, single non-repeating roots or parent elements are shown as a "folder" icon 350. A star associated with the icon such as the star in the upper right hand corner of the folder icon 350 indicates that the element or attribute associated with the icon is a required element according to the associated schema file. The absence of a star associated with an icon indicates that the element or attribute is optional according to the associated schema file. A "note" icon 360 is provided to indicate a markup language attribute, and a "page" icon 370 indicates a markup language element. A multiple "page" icon 380 indicates the element may repeat within the context if its parent.

As discussed above, other visual indicators may be provided according to embodiments of the present invention. An element or attribute that has been applied to the grid 110 may be boldfaced to indicate that the associated element or attribute has been applied to the grid. Also, as mentioned above, synchronization between an element and the tree view structure 120 and a target location in the grid 110 is maintained so that if the user selects the target location, the corresponding element or attribute in the tree view structure is highlighted. Conversely, if the user selects an element or attribute in the tree view structure 120, the corresponding target location in the grid 110 is highlighted to show the user the location in the grid associated with the element or attribute. Additionally, a small amount of XML data that has been imported into the grid 110 may be shown adjacent to a corresponding element or attribute in the tree view structure 120. For example, referring back to FIG. 1, once the data "Rob Collie" is imported to the target location, cell D3, a portion of that data, for example "Rob Collie" may be shown next to the associated <name> element 132 in the tree view structure 120. Thus, the user is provided helpful contextual information for quickly associating an element or attribute from the tree view structure 120 with a corresponding target location and data entry in the grid 110.

Figure 7:
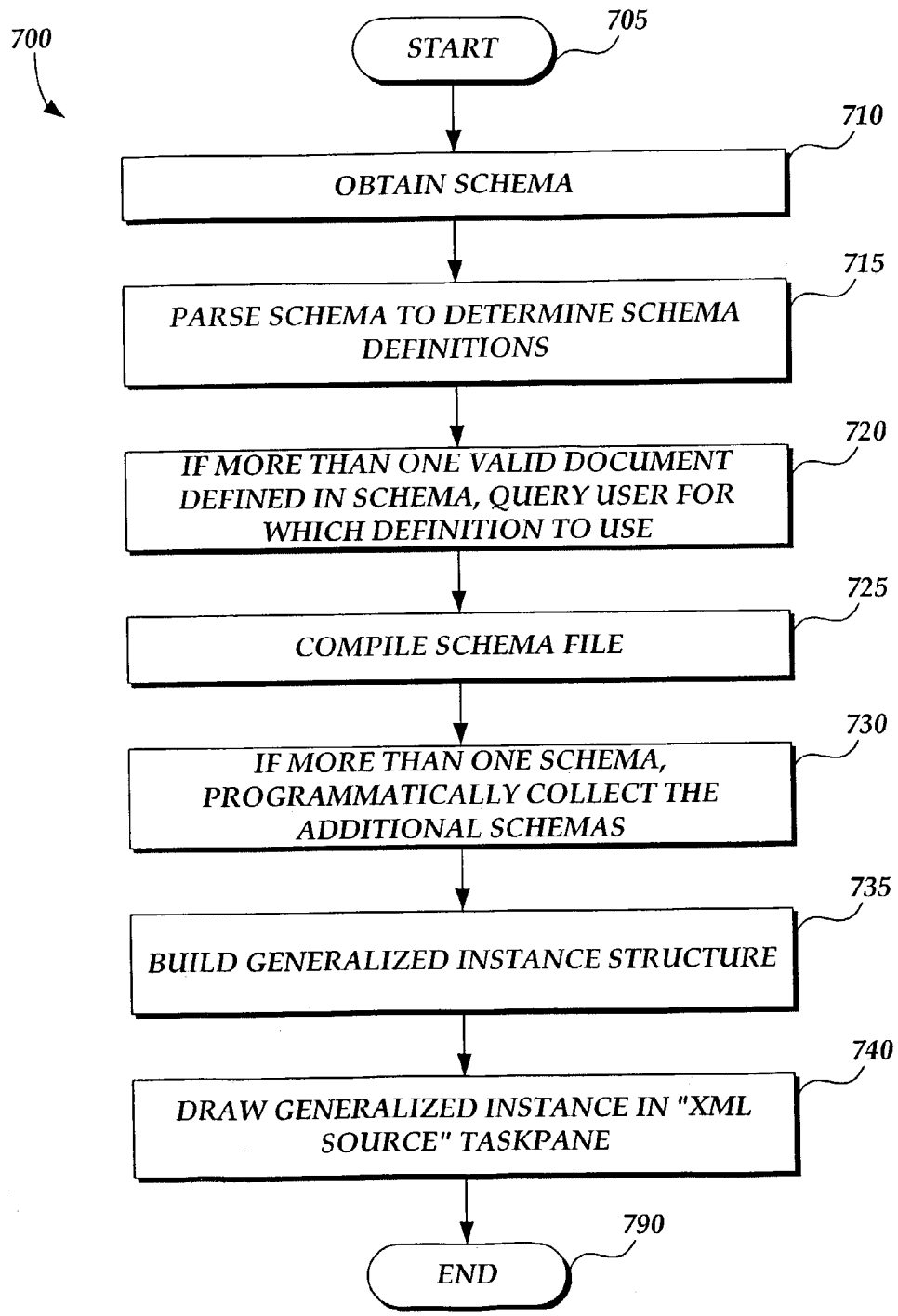
FIG. 7 is a flow chart illustrating a method for creating a tree view of a generalized instance of an XML schema file for presenting to a user via a tree view pane.

FIG. 7 is a flow chart illustrating a method for creating a tree view structure 120 of a generalized instance of an XML schema file that is associated with or attached to a document presented in the grid 110 of the user's spreadsheet application. Once the tree view structure 120 is created, it is drawn to the pane 115 for presentation to and use by the user as described above. The method 700 begins at start step 705 and proceeds to step 710 where a schema file is obtained for association with or attachment to the document being utilized or created in the spreadsheet grid 110. As should be understood by those skilled in the art, the user may have opened a document into the grid 110 to which a schema file has already been attached or associated. That is, the software application preparing the document such as a spreadsheet application, or a dynamic link library (DLL) for finding associated or attached schema files may be utilized to parse the document opened by the user to locate any associated or attached schema files for use in creating the tree view structure 120.

Alternatively, if the schema file is not attached to or associated with the document opened by the user into the grid 110, a schema file must be obtained and associated with or attached to the document. As should be understood by those skilled in the art, the user may create a schema file for the document, the user may obtain a schema file from a list of available schema file resources.

Once the schema file is obtained at step 710, the method proceeds to step 715, and the schema file is parsed by the XML module 105, such as MSXML5.0 manufactured by Microsoft Corporation, to expose a Schema Object Model (SOM) that enables the spreadsheet application to extract definitions given by the XSD (schema). For example, a definition might include that a <name> element requires a first name, followed by a middle name, followed by a last name. Accordingly, a document having data entered within a markup element associated with the <name> element must be entered according to the definition for that element in order for the schema file to successfully validate the document.

After the schema file has been parsed to determine all definitions, data types and data requirements according to the schema file, the method proceeds to step 720. At step 720, a determination is made as to whether more than one valid document may be validated according to the associated schema. As understood by those skilled in the art, XML files contain one root that contains the rest of the marked up data. However, a single schema file may define multiple root elements. For example, one schema file may include both a root defined for the purchase order schema, as well as an additional root element (sibling to the first root element in the schema definition) that defines some additional structure. According to embodiments of the present invention one schema file may only define elements and attributes for one namespace. When a spreadsheet application encounters a schema that defines multiple root elements, the user is queried to clarify which root element they want to work with to consume and create XML instance files.

At step 725, the selected schema file is compiled by the XML module 105 to create a SOM that is put into a collection of compiled schemas for use with the selected document. As should be understood, any given document may be associated with more than one XML namespace. That is, just as one schema file may be used to validate a number of different documents, any given document may be associated with a number of different schema files that may be used to validate data contained in the document. For example, one document may include employee information for a given company in addition to financial data for a given company. Accordingly, the document may be associated with one schema file for defining data rules associated with financial information for the document, and the document may be associated with a second schema file for defining data rules associated with the employee information contained in the document. At step 730, if more than one schema file is associated with the document, each of the required schema definitions are programmatically gathered without requiring user input. A user annotating a given spreadsheet grid 110 with markup language structure according to the present invention would select a tree view structure 120 associated with one schema file for annotation of the grid 110 according to that schema file, followed by selection of a different tree view structure 120 associated with a different schema file if the user desires to annotate the grid 110 according to a second schema file.

At step 735, the XML module 105 builds a generalized instance structure (tree view structure 120) from the selected schema for presentation to the user in the pane 115. According to one embodiment, the generalized instance structure may be built using a DLL accessible by the spreadsheet application such as "mso.dll" manufactured by Microsoft Corporation. According to an embodiment of the present invention, the generalized instance structure created from the selected schema file represents a schema structure that would be associated with the document where all applicable markup language elements and/or attributes associated with the selected schema file are applied to the document. That is, all available options for annotating a document associated with the selected schema are shown in the tree view structure for potential selection by the user. On the other hand, any elements or attributes that may not be applied to a spreadsheet application grid 110 are omitted from the tree view structure 120 created at step 735. For example, if a given markup language element associated with the selected schema cannot be mapped to a spreadsheet application document, that element or attribute will not be shown in the tree view structure 120.

According to an embodiment of the present invention the generalized instance structure is created where each node of the instance structure represents the hierarchical elements and attributes, associated sibling elements and attributes and associated parent elements along with information as to the name and location of each element or attribute associated with selected schema file. Additionally, an XPATH for locating a given element and attribute in the associated schema file is written to the generalized instance structure for each element and attribute. Accordingly, when an element or attribute is subsequently dropped to a target location within the grid 110, the XPATH for locating the dropped element or attribute is written to the target location for pointing the target location in the grid 110 back to the dropped element and/or attribute.

Once the generalized instance structure is built at step 735, the method proceeds to step 740 and a tree view control for drawing tree view structures such as the tree view structure 120 illustrated in FIG. 1 draws the tree view structure 120 in the pane 115 associated with the generalized instance of the selected schema. That is, the hierarchical structure of the schema where a root element may include a number of child elements, which may be parent elements of other child elements, where each parent element includes a number of child elements and/or attributes in a hierarchical structure is drawn to visually represent the relationship between each child element and/or attribute with its associated sibling elements the relationship between child elements to their associated parent elements, and the association between a variety of parent elements to a root element. As should be understood, the tree view control for drawing the tree view structure 120 and pane 115 may be an application programming interface for drawing tree view structures, or the tree view structure may be drawn by a separate software program module such as a DLL or API associated with the software application providing the grid 110 and the pane 115. The method ends at 790.

According to an embodiment of the present invention, the data type, for example integer, string, etc., is not shown in the tree view structure 120 in association with each illustrated element or attribute. That is, if the element is a "date" data type, that information is not provided in the tree view structure 120, but if that element is dragged and dropped to a target location within the grid 110, the target location will be formatted according to the data type for "date". If subsequent data is inserted into the target location, for example cell H8 in the grid 110, that data will be formatted according to the data type "date" associated with the dropped <date> element.

As described above with reference to FIGS. 1–7, a tree view structure 120 representing a generalized instance structure of a schema associated with a document is created and presented to a user via a "Tree View" control hosted by the "XML Source" tree view task pane 115 to allow the user to annotate a document, such as a spreadsheet application document, by dragging and dropping selected elements or attributes from the tree view structure to target locations in the associated document. As should be understood by those skilled in the art, elements and/or attributes from the tree view structure 120 may be applied to the document through other methods in addition to dragging/dropping, such as highlighting the selected element or attribute followed by clicking on the target location within the document.

According to embodiments of the present invention, data structure associated with the tree view structure 120 may be applied to a document according to a number different methods. For example, elements or attributes from the tree view structure 120 may be dropped onto a blank spreadsheet grid 110 where the user is creating a new document having no data or other data structure. Alternatively, the user may open a document into the grid 110 that already contains some data and/or data type structure, and the user may apply elements or attributes from the tree view structure 120 to the opened document and currently present data. Likewise, the user may open a preformatted document such as a time card, purchase order, and the like in order to apply markup language elements or attributes associated with a selected schema file. For example, the user may wish to markup a time card template with XML schema to allow the time card data in the spreadsheet to be expressed in a time care XML data format, to be consumed by other applications utilizing the schema file with which the time card data is annotated. Of course, as should be understood, for all of the above-described methods, a schema file must be associated with the new or previously prepared document so that the tree view structure 120 may be created for use with the document as described above with reference to FIG. 7. However, other applications that consume the XML data are not always required to use the schema file. For example, an XSLT transformation file or other suitable code may be written to parse the XML data and get at the data of interest without using the schema file.

Figure 8:
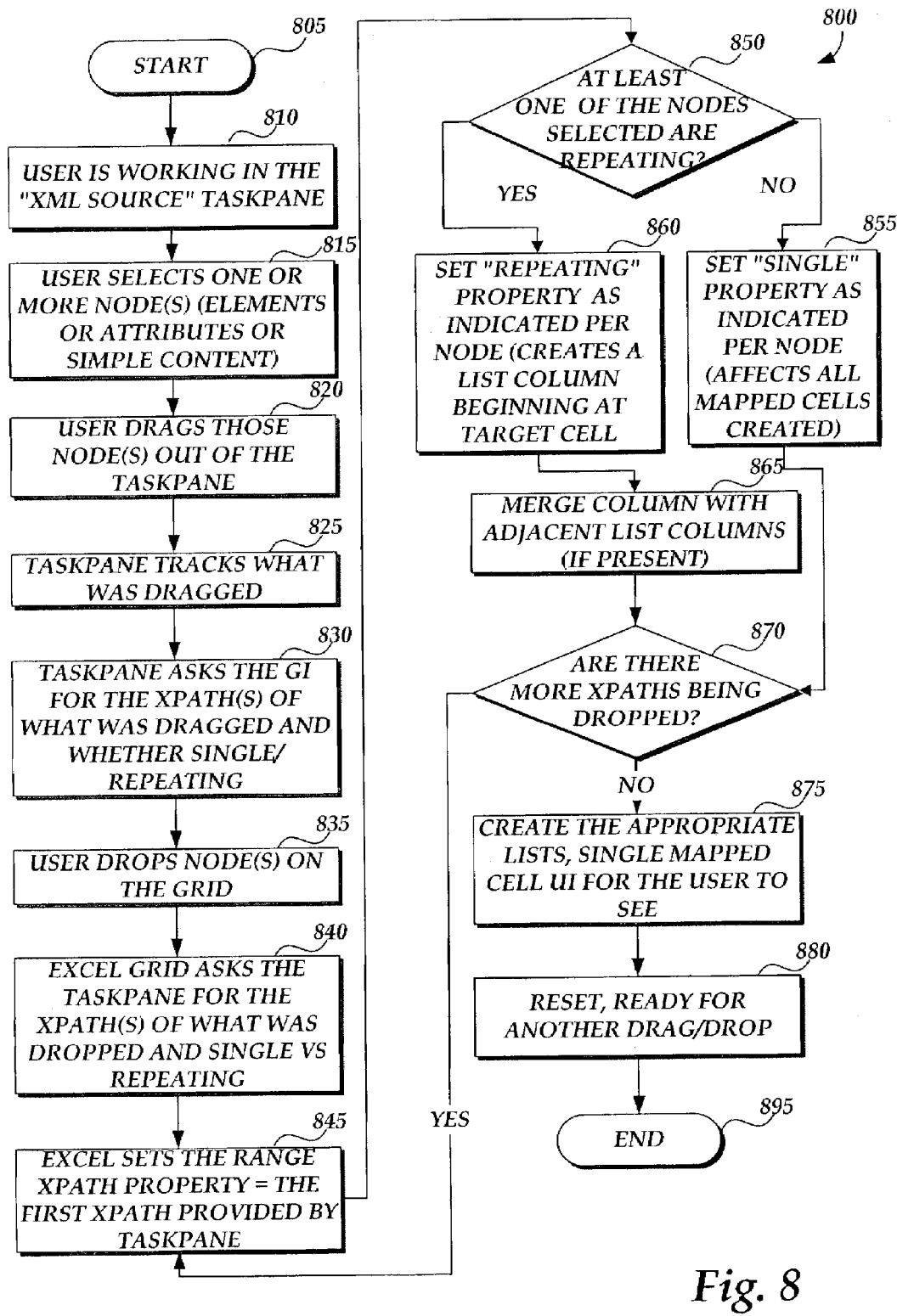
FIG. 8 is a flow chart illustrating a method for mapping elements and/or attributes of a markup language schema file to corresponding target locations in a spreadsheet application workspace grid.

Referring then to FIG. 8, a flow chart is described illustrating a method for mapping elements and/or attributes of a markup language schema file from a tree view structure 120 representing a generalized instance of the schema file to target locations in a spreadsheet application workspace grid 110. The method 800 illustrated in FIG. 8 begins with start step 805 and proceeds to step 810 where a user opens a document into the grid 110 of the spreadsheet application 100 for creation of a new document or for editing an existing document. In order to apply XML structured to the document, the user associates a selected schema file to the document, or the user selects a document that has been previously associated with a selected schema file. Upon opening the new document or existing document with an associated schema file, the user may select to have the tree view structure 120 for the associated schema file created and presented in the pane 115 to allow the user to apply markup language elements associated with the schema file to the document. According to an embodiment of the present invention, the user may be allowed to selectively create the tree view structure 120, or the tree view structure 120 may be created automatically for the schema file associated with the document.

After the user opens the document for creation or editing and after the associated tree view structure 120 is created as described above with reference to FIG. 7, the method proceeds to step 815. The user selects one or more nodes from the tree view structure 120 for application to a target location in the document displayed in the grid 110 of the spreadsheet application. As shown in FIG. 4, the user may select a single non-repeating element such as the <name> element 132 for application to a target location such as cell H8 in the grid 110. Alternatively, the user may select a plurality of repeating elements from the tree view structure 120 for application to the document, as described in FIG. 5 where repeating elements 145, 146, and 147 are selected and dropped to the grid 110. Alternatively, the user may select a plurality of repeating elements and one or more single non-repeating elements for application to a target location in the grid 110, as illustrated in FIG. 5. At step 820, the selected nodes are dragged from the pane 115 to the grid 110. At step 825, a task pane programming module tracks information about all nodes being dragged from the tree view structure 120 to the grid 110. As described above, each node in the tree view structure 120 has an associated XPATH so that the eventual target location in the grid 110 may relate itself to the element or attribute dropped to it from the schema file associated with the tree view structure 120. At step 830, the task pane 115 obtains the XPATHs of the nodes being dragged from the tree view structure 120. Additionally, the task pane 115 determines whether the selected element or attribute is single or repeating.

At step 835, the user drops the selected element or attribute onto the grid 110 at the target location. For example, referring to FIG. 4, the user drops a selected <name> element 132 onto a target location, cell H8, of the grid 110. At step 840, the spreadsheet application grid 110 queries the task pane 115 for the XPATH of the node that has been dropped to the target location, and the grid 110 queries the task pane 115 to determine whether the dropped element or attribute is single or repeating. Also at step 840, the spreadsheet application grid 110 queries the task pane 115 for the data type of the node that has bee dropped to the target location. At step 845, the spreadsheet application sets the range XPATH property for the target cell to the first XPATH provided by the task pane. For example, if the user selected a single non-repeating element such as the <name> element 132 illustrated in FIG. 4, the XPATH property will be set as the XPATH provided for the single non-repeating <name> element 132. Alternatively, if the user selects a plurality of repeating elements 145, 146, and 147, at step 845, the spreadsheet sets the range XPATH property to the XPATH for the first element provided by the task pane, for example the <date> element 145.

At step 850, a determination is made as to whether at least one of the selected nodes is single or repeating. If yes, the method proceeds to step 860, and the spreadsheet application sets a repeating property associated with the dropped node. According an embodiment of the present invention the task pane 115 builds a collection of XPATHS associated with what has been dragged from the pane 115 to the target location in the grid 110. If the user has selected, for example, a plurality of repeating items 145, 146, and 147, a list such as described with reference to FIG. 5 is created having columns beginning at the target location to which the selected elements are dropped and including a number of columns equal to the number of repeating elements or attributes selected by the user. For example, if the user selects the <date> element 145, the <description> element 146, and the <amount> element 147 illustrated in FIG. 5 and drops those selected elements to target cell location I8 in the grid 110, a repeating property is set in the target cell I8 associated with a three-column list object for receiving repeating data under each of the data types date, description, and amount. At step 865, any list objects created at step 860 are merged with adjacent list objects if present.

If the user first selects the repeating <date> element 145, as illustrated in FIG. 5 and drags that element to a target cell I8 in the grid 110, a single list object associated with the repeating element <date> is created and a repeating property is set in the target cell I8. If the user subsequently drags the repeating <description> element 146 from the tree view structure 120 to the target cell J8 immediately adjacent to the previous target cell I8, a list object associated with the <description> element 146 is created and merged with the list object created for the <date> element 145 to create a two-column list. If repeating elements are dropped in non-adjacent locations, the resulting list objects are not merged and separate list objects are created.

Referring back to step 850, if all of the nodes selected from the tree view structure 120 for dropping onto a target cell in the grid 110 are single non-repeating nodes, then the method proceeds to step 855, and a "single" property is set at the target cell location meaning that the data associated with the dropped element or attribute will effect only the target cell as illustrated in FIG. 4 where the single non-repeating <name> 132 is dropped to the target H8 in the grid 110. If the user selects multiple nodes, all of which are single non-repeating elements, a series of single mapped cells are created, from left to right just like the list objects.

After the single or repeating elements or attributes are dropped to the target locations in the grid 110, as described with reference to steps 855 or 860, the method proceeds to step 870, and a determination is made as to whether more XPATHS are being dropped. That is, a determination is made as to whether any other elements or attributes have been selected from the tree view structure 120 in the task pane 115 for dropping to target locations in the grid 110. If yes, the method proceeds back to step 845 and the spreadsheet application sets the range XPATH property equal to the next XPATH provided by the task pane 115 for the subsequently selected elements or attributes.

If no additional XPATHs are being dropped, the method proceeds to step 875 and the appropriate list or single mapped cell user interface is created for presentation to the user. For example, as illustrated in FIG. 4, if a single non-repeating <name> element 132 is dragged from the tree view structure 120 in the task pane 115 to the target cell location H8 in the grid 110, the border 250 is created and presented to the user to show the user visually the location of the single non-repeating element application to the grid 110. For another example, referring to FIG. 5, if the user has selected the single non-repeating <name> element and the repeating elements 145, 146, and 147, a list user interface 300 is created and is shown to user beginning at the target cell location H8 and extending across columns H, I, J, and K to show the user visually the location of the list objects that will be associated with repeating data associated with the <date>, <description> and <amount> elements, and to show the user the location of the single non-repeating name element associated with the repeating elements 145, 146 and 147. After the single cell or list object user interfaces are provided to the user, as described, the method proceeds to step 880 where the user may select additional elements for application to the grid 110.

According to an embodiment of the present invention, if the user selects more than one single non-repeating element for dropping to the grid 110, each element is represented by a single border 250 in the grid 110. On the other hand, if the user selects a repeating element, the repeating will be shown visually as a list within the grid 110 starting at the target location of the dropped repeating element. If the user selects a mix of single and repeating elements, as illustrated in FIG. 5, list objects will be created for each element including the single non-repeating elements. That is, if ten non-repeating elements and one single element are selected and dropped to a target location, eleven list objects are created. According to one embodiment of the present inventions, a user interface may be provided to the user in such a case to allow the user to convert single non-repeating elements back to non-repeating single cells. Otherwise, the single non-repeating cell is treated as a list object because it has been selected along with repeating elements and will be "filled down" with data associated with data items under the list objects. For example referring to FIG. 5, if data associated with the <date>, <description>, and <amount> elements is added to the grid 110 for five different expense items, the date, description, and amount for each expense item will be filled into the grid starting at row 9 and continuing to row 13 in columns beneath the target row H.

As shown in FIG. 5, according to the schema associated with the document created in the grid 110, headings for the <date>, <description>, and <amount> elements are inserted into the target row 8 when those elements are dropped to the target location. Following with the present example, if data associated with the <date>, <description>, and <amount> is entered under the "date", "description" and "amount" headings in columns beneath those headings, a <name> associated with the name element 132 will be "filled down" in a column beginning at cell H9 and extending down for each row of data entered under the <date>, <description>, and <amount> elements. If this result is acceptable to or desired by the user, the user may accept the result, but if this result is not acceptable to or desirable by the user, the user may select to convert the <name> element annotation to the grid 110 back to a single non-repeating element. According to one embodiment of the present invention, any time a mixture of single and repeating elements is applied to the grid 110, as described, a user interface for allowing the user to convert the single non-repeating element from a list object back to a single cell may be provided to the user so that if the data associated with the document created in the grid 110 is exported to a separate application, the single non-repeating element is properly applied to the document as a single non-repeating element.

As described above, and as illustrated in FIG. 5, additional options may be provided to the user such as the creation of headers associated with the elements dropped to the grid 110. Accordingly, if the user drags data associated with a header such as the <date>, <description>, or <amount> elements 145, 146, and 147, illustrated in FIG. 5, headers associated with those elements are created in the target cells of the grid 110. Additionally, as described above, other visual indicators of the application of the elements or attributes to the grid 110 are provided. For example, according to the embodiments of the present invention elements or attributes applied to the grid 110 are boldfaced or otherwise highlighted to show the user visually what elements or attributes have been applied to the document in the grid 110. Additionally, as described above, if the user selects an element or attribute in the tree view structure 120 a corresponding cell or list object target location in the grid 110 is highlighted to show the user the location in the grid 120 to which the element or attribute has been applied. Conversely, if the user selects a given location in the grid 110 to which an element or attribute has been mapped, the corresponding node in the tree view structure 120 is highlighted to show the user an element or attribute associated with given location in the grid 110.

It will be apparent to those skilled in the art that various modifications or variations may be made in the present invention without departing from the scope or sprit of the invention. Other embodiments of the invention will be apparent to those skilled in the art from consideration of this specification and practice of the invention disclosed herein.

We claim:

1. A computer readable medium containing instructions which when executed by a computer perform the steps of:
    associating a schema file with a spreadsheet application document defining permissible data definitions for the document;
    building an instance structure of the associated schema file representing all available nodes of the associated schema file that are applicable to the document;
    displaying a tree view of the instance structure for providing a visual representation of the instance structure of the associated schema file whereby the tree view contains hierarchically-structured nodes visually representing nodes of the markup language defined by the associated schema file that are applicable to the document according to the associated schema file;
    applying an element or attribute selected from the tree view to a target location in the document; and
    writing a pointer to the target location for pointing the target location to the selected element or attribute in the associated schema file via the instance structure.

2. The computer readable medium of claim 1 containing instructions which when executed by a computer further perform creating a mapping between the document and the associated schema file including building a collection of pointers associated with all selected elements or attributes that are applied to the document for pointing markup language nodes applied to the document to corresponding nodes in the associated schema file for defining each element and attribute applied to the document.

3. The computer readable medium of claim 1 containing instructions which when executed by a computer further perform parsing the schema file to determine data definitions required for a valid document according to the associated schema including parsing the schema file to determine permissible data types, data structures and data type grammatical rules for applying markup language nodes associated with the schema file to the document.

4. The computer readable medium of claim 1 containing instructions which when executed by a computer further perform the steps of providing a visual indication in the tree view of any elements or attributes that have been applied to the document; and providing a visual indication in the target location that a selected element or attribute has been applied to the target location.

5. A method for mapping markup language data to a spreadsheet application document, comprising:
    associating a schema file with a spreadsheet application document defining permissible data definitions for any XML data in the document;
    parsing the schema file to determine data definitions required for valid XML data according to the associated schema file;
    building an instance structure of the associated schema file representing all available elements, attributes or simple data content of the associated schema file that are applicable to the spreadsheet application document;
    displaying a tree view of the instance structure for providing a visual representation of the instance structure of the associated schema file whereby the tree view contains hierarchically-structured nodes visually representing elements and attributes and simple data content of the markup language defined by the associated schema file that are applicable to the spreadsheet document according to the associated schema file;
    applying an element or attribute selected from the tree view to a target location in the document; and writing a pointer to the target location for pointing the target location to the selected element or attribute in the associated schema file, wherein the steps of associating, parsing, building, displaying, applying, and writing establish a relationship between the markup language and the spreadsheet application document so that the instance structure is maintained when the markup language is imported to the spreadsheet application document.

6. The method of claim 5, whereby the step of building an instance structure of the associated schema file further comprises:
building a hierarchically-arranged structure showing a relationship of nodes of the markup language to one another according to the associated schema file.

7. The method of claim 6, further comprising omitting from the instance structure any markup language elements or attributes that are not applicable to the document according to the associated schema file.

8. The method of claim 5, whereby displaying the tree view of the instance structure includes writing a pointer to each element or attribute in the instance structure for pointing a given element or attribute of the instance structure to a target location in the document where the given element or attribute is applied.

9. The method of claim 8, whereby the step of writing a pointer to the target location for pointing the target location to the selected element or attribute in the associated schema file includes writing a pointer from the selected element or attribute in the instance structure to the target location for pointing the selected element or attribute applied to the target location back to a corresponding element or attribute in the instance structure.

10. The method of claim 9, further comprising building a collection of pointers associated with all selected elements or attributes that are applied to the document.

11. The method of claim 10, whereby building a collection of pointers associated with all selected elements or attributes that are applied to the document includes creating a mapping between the document and the associated schema file for pointing markup language nodes applied to the document to corresponding nodes in the associated schema file for defining each element and attribute applied to the document.

12. The method of claim 8, whereby writing a pointer to each element or attribute in the instance structure includes writing an XPATH to associate each element or attribute in the instance structure with the target locations in the document where any of the elements or attributes are applied.

13. The method of claim 5, whereby the step of displaying a tree view structure from the instance structure includes creating the tree view structure with a tree view control module.

14. The method of claim 5, whereby the step of parsing the schema file to determine data definitions required for a valid document according to the associated schema includes parsing the schema file to determine permissible data types, data structures and data type grammatical rules for applying markup language nodes associated with the schema file to the document.

15. The method of claim 14, after the step of parsing the schema file to determine the data definitions required for a valid document according to the associated schema, further comprising the steps of:
determining whether more than one XML instance structure may be validated according to the associated schema file; and
if more than one XML instance structure may be validated according to the associated schema file, selecting one XML instance structure from the one or more XML instance structures.

16. The method of claim 15, whereby selecting one XML instance structure from the one or more XML instance structures includes querying a user of the document for a selection of the one XML instance structure from the more than one XML instance structures.

17. The method of claim 16, whereby querying the user of the document includes providing a user interface for selecting the XML instance structure from the one or more XML instance structures.

18. The method of claim 5, after the step of parsing the schema file to determine data definitions required for a valid document according to the associated schema, further comprising the steps of:
compiling the associated schema file;
determining whether more than one schema files is associated with the document; and
if more than one schema file is associated with the document, compiling all available schema files for inclusion in the general instance structure.

19. The method of claim 5, prior to applying the selected element or attribute to the target location in the document, selecting an element or attribute from the tree view for application to a target location in the document.

20. The method of claim 19,
whereby selecting an element or attribute of the tree view structure for application to a target location in the document includes clicking on and dragging a selected element or attribute from the tree view structure; and
whereby applying the selected or attribute to the target location in the document includes releasing the mouse button or dropping the selected element or attribute dragged from the tree view structure to the target location in the document.

21. The method of claim 20, further comprising tracking the identity of the selected node and tracking the movement of the selected node from the tree view structure to the target location in the document.

22. The method of claim 21, further comprising querying the instance structure for a pointer to the selected node.

23. The method of claim 22, whereby the step of querying the instance structure includes querying by the spreadsheet application to the instance structure for the XPath pointer to the selected node.

24. The method of claim 23, whereby the step of querying the instance structure includes querying the instance structure via a tree view pane displaying the tree view structure.

25. The method of claim 24, further comprising querying the instance structure via the tree view pane to determine whether the selected node is repeating or non-repeating.

26. The method of claim 19, whereby selecting a node of the tree view for application to a target location in the document includes selecting a single non-repeating element or attribute.

27. The method of claim 26, whereby if the selected element or attribute is a non-repeating element or attribute, setting a range property for the target location equal to a single cell.

28. The method of claim 26, whereby the step of selecting an element or attribute of the tree view structure for application to a target location in the document includes selecting a plurality of non-repeating elements or attributes.

29. The method of claim 19, whereby the step of selecting an element or attribute of the tree view structure for application to a target location in the document includes selecting a repeating element or attribute.

30. The method of claim 29, whereby if the selected element or attribute is a repeating element or attribute,
setting a range property for the target location equal to a list of cells; and
setting a repeating element property for the target location.

31. A method of claim 30, whereby if the selected node is a repeating element or attribute, creating a list object associated with the selected repeating element or attribute.

32. The method of claim 31, further comprising associating the list object with the target location.

33. The method of claim 32, further comprising merging a first list object with a second list object where a target location for the first list object is adjacent to a target location for the second list object from a same mapping.

34. The method of claim 19, whereby the step of selecting an element or attribute of the tree view structure for application to a target location in the document includes selecting a plurality of repeating elements or attributes.

35. The method of claim 19, whereby the step of selecting an element or attribute of the tree view for application to a target location in the document includes selecting a combination of non-repeating elements or attributes and repeating elements or attributes.

36. The method of claim 5, whereby applying the selected element or attribute to the target location in the document includes applying the selected element or attribute to a spreadsheet application grid cell.

37. The method of claim 5, further comprising providing a visual indication in the tree view of any elements or attributes that have been applied to the document.

38. The method of claim 37, further comprising bold facing the visual representation of any element or attribute in the tree view to indicate that the highlighted element or attribute has been applied to the document.

39. The method of claim 38, whereby upon selection of any element or attribute in the tree view that has been applied to the document, providing a visual indicator in the document of the target location in the document where the selected element or attribute is applied.

40. The method of claim 39, whereby selection of any element or attribute in the tree view that has been applied to the document includes focusing a mouse cursor on the selected element or attribute.

41. The method of claim 39, whereby selection of any element or attribute in the tree view that has been applied to the document includes clicking a mouse cursor on the selected element or attribute.

42. The method of claim 38, whereby upon selection of any target location in the document that has an element or attribute applied to the target location, highlighting the applied element or attribute in the tree view to visually indicate the element or attribute that has been applied to the selected target location.

43. The method of claim 39, further comprising providing a visual indication in the target location that a selected element or attribute has been applied to the target location.

44. The method of claim 40, whereby if the applied element or attribute is a single non-repeating element or attribute, providing a border around the target location.

45. The method of claim 41, whereby if the applied element or attribute is a repeating element or attribute, providing a list object header in the target location.

46. The method of claim 5, whereby the markup language is the eXtensible Markup Language (XML).

47. A computer readable medium containing instructions which when executed by a computer perform the steps of:
associating an XML schema file with a spreadsheet application document defining permissible data definitions for the document;
building an instance structure of the associated XML schema file representing all available nodes defined by the associated schema file that are applicable to the document and representing a relationship of the available nodes to one another as defined by the associated schema file;
displaying a tree view of the instance structure for providing a visual representation of the instance structure of the associated XML schema file whereby the tree view contains hierarchically-structured nodes visually representing elements and attributes of the markup language defined by the associated schema file that are applicable to the document according to the associated schema file;
applying an element or attribute selected from the tree view to a target location in the document;
writing an XPATH pointer to the target location for pointing the target location to the selected element or attribute in the associated schema file via the instance structure;
creating a mapping between the document and the associated schema file including building a collection of XPATH pointers associated with all selected elements or attributes that are applied to the document for pointing markup language nodes applied to the document to corresponding nodes in the associated schema file for defining each element and attribute applied to the document;
providing a visual indication in the tree view of any elements or attributes that have been applied to the document; and
providing a visual indication in the target location that a selected element or attribute has been applied to the target location.

48. A method for mapping eXtensible Markup Language (XML) data to a spreadsheet application document, comprising:
associating an XML schema file with a spreadsheet application document defining permissible data definitions for the document;
building an instance structure of the associated XML schema file representing all available nodes defined by the associated schema file that are applicable to the document and representing a relationship of the available nodes to one another as defined by the associated schema file;
displaying a tree view of the instance structure for providing a visual representation of the instance structure of the associated XML schema file whereby the tree view contains hierarchically-structured nodes visually representing XML nodes defined by the associated schema file that are applicable to the document according to the associated schema file;
applying an element or attribute selected from the tree view to a target location in the document;
writing an XPATH pointer to the target location for pointing the target location to the selected element or attribute in the associated schema file via the instance structure;
creating a mapping between the document and the associated schema file including building a collection of XPATH pointers associated with all selected elements or attributes that are applied to the document for pointing XML nodes applied to the document to corresponding nodes in the associated schema file for defining each element and attribute applied to the document;

providing a visual indication in the tree view of any elements or attributes that have been applied to the document; and providing a visual indication in the target location that a selected element or attribute has been applied to the target location, wherein the steps of associating, building, displaying, applying, writing, creating, providing a visual indication in the tree view, and providing a visual application in the target location establish a relationship between the XML nodes and the spreadsheet application document so that the instance structure is maintained when the XML nodes are imported to the spreadsheet application document.

49. The method of claim 48, whereby applying an element or attribute from the tree view for application to a target location in the document includes applying a single non-repeating element or attribute.

50. The method of claim 49, whereby if the applied element or attribute is a non-repeating element or attribute, setting a range property for the target location equal to a single cell.

51. The method of claim 48, whereby the step of selecting an element or attribute of the tree view structure for application to a target location in the document includes selecting a repeating element or attribute.

52. The method of claim 51, whereby if the selected element or attribute is a repeating element or attribute, setting a range property for the target location equal to a list of cells; and setting a repeating element property for the target location.

53. The method of claim 52, whereby if the selected element or attribute is a repeating element or attribute, creating a list object associated with the selected repeating element or attribute.

* * * * *